United States Patent

Bower et al.

[15] 3,666,743
[45] May 30, 1972

[54] POLYMERIZATION OF 1-OLEFINS WITH TETRAKIS(BICYCLOHEPTYL)CHROMIUM COMPOUNDS AS CATALYSTS

[72] Inventors: Barton K. Bower, Newark; Wendell P. Long, Wilmington, both of Del.

[73] Assignee: Hercules Incorporated, Wilmington, Del.

[22] Filed: Feb. 2, 1971

[21] Appl. No.: 112,016

[52] U.S. Cl. ........................260/93.7, 204/159.24, 252/428, 252/429 A, 252/431, 260/80.78, 260/88.2 B, 260/94.9 B, 260/94.9 D, 260/878 B
[51] Int. Cl. ........................C08f 1/16, C08f 1/42, C08f 15/40
[58] Field of Search ........................260/94.9 B, 94.9 D, 93.7; 252/428, 429 A, 431; 204/159.24

[56] References Cited

UNITED STATES PATENTS 3,257,332  6/1966  Ziegler et al. ........................260/94.9 B

*Primary Examiner*—Joseph L. Schofer
*Assistant Examiner*—A. Holler
*Attorney*—Edwin H. Dafter, Jr.

[57] ABSTRACT

Tetrakis(1-bicycloheptyl)chromium compounds are catalysts for the polymerization of 1-olefins when activated by the addition of an organometallic compound and/or exposure to light. The polymerization process can be carried out by using a solution of the chromium compound or by extending the chromium compound on a solid support such as silica.

17 Claims, No Drawings

POLYMERIZATION OF 1-OLEFINS WITH TETRAKIS(BICYCLOHEPTYL)CHROMIUM COMPOUNDS AS CATALYSTS

This invention relates to a process for the polymerization of 1-olefins and more particularly to the process wherein a tetrakis(bicycloheptyl)chromium compound is used as the catalyst.

It is well known that 1-olefins can be polymerized at low pressure using as the catalyst a transition metal salt in combination with an alkylaluminum compound as activator. It is also known that chromium oxide extended on a solid support such as silica can be used as the catalyst. However, the preparation of these catalysts is time-consuming. Because they are prepared in aqueous medium, the water must be removed and in so doing, great care must be exercised to control the number of the hydroxyl groups on the surface of the silica. These catalysts must then be stored under anhydrous conditions until used.

Now in accordance with this invention it has been discovered that 1-olefins can be polymerized using as the catalyst a tetrakis(bicycloheptyl)chromium compound activated by addition of an organometallic compound or by exposure to light, or by a combination of the two, whereupon very high catalyst mileages are obtained. These chromium compounds are stable compounds that can be handled at room temperature and can then be used in hydrocarbon solution for the polymerization process or they can be extended on a support such as silica simply by adding the hydrocarbon solution of the chromium compound to the silica.

The tetrakis(1-bicycloheptyl)chromium compounds used as catalysts for the polymerization of 1-olefins in accordance with this invention have the general formula

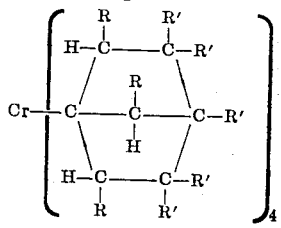

where one $R$ is $H$ or $CH_3$ and the other Rs are $H$ and each of the $R'$'s is $H$ or $CH_3$, and the total number of $CH_3$ groups attached to the bicycloheptyl ring is 0 to 3. Exemplary of these tetravalent chromium compounds that can be used are tetrakis(1-bicyclo[2·2·1]-heptyl)chromium which can also be named tetrakis(1-norbornyl)-chromium; and the corresponding compounds where the bicycloheptyl radical is 2-methyl-1-bicyclo-[2·2·1]-heptyl
3-methyl-1-bicyclo-[2·2·1]-heptyl
4-methyl-1-bicyclo-[2·2·1]-heptyl
7-methyl-1-bicyclo-[2·2·1]-heptyl
2,3-dimethyl-1-bicyclo-[2·2·1]-heptyl
2,4-dimethyl-1-bicyclo-[2·2·1]-heptyl
2,5-dimethyl-1-bicyclo-[2·2·1]-heptyl
3,3-dimethyl-1-bicyclo-[2·2·1]-heptyl
3,4-dimethyl-1-bicyclo-[2·2·1]-heptyl
3,5-dimethyl-1-bicyclo-[2·2·1]-heptyl
3,7-dimethyl-1-bicyclo-[2·2·1]-heptyl
4,7-dimethyl-1-bicyclo-[2·2·1]-heptyl
2,3,3-trimethyl-1-bicyclo-[2·2·1]-heptyl also known as 1-camphyl
2,3,4-trimethyl-1-bicyclo-[2·2·1]-heptyl
2,3,5-trimethyl-1-bicyclo-[2·2·1]-heptyl
2,5,5-trimethyl-1-bicyclo-[2·2·1]-heptyl
3,3,7-trimethyl-1-bicyclo-[2·2·1]-heptyl
3,4,6-trimethyl-1-bicyclo-[2·2·1]-heptyl
3,4,7-trimethyl-1-bicyclo-[2·2·1]-heptyl The tetrakis(bicycloheptyl)chromium compounds can be prepared by reacting the corresponding bridgehead lithium compound with an anhydrous chromium salt. In many cases, it is advantageous to use an ether complex of the metal salt. The bicyclo chromium compound so produced is always a tetravalent chromium compound regardless of the valence of the chromium salt reacted with the lithium compound. When lower valent chromium compounds are used the tetravalent chromium is generated by a disproportionation reaction with the formation of lower valent chromium compounds or chromium metal. Exemplary of the chromium salts that can be reacted to produce these tetra bridgehead chromium compounds are chromous and chromic halides such as chromium dichloride, chromium trichloride, chromium trichloride tetrahydrofuranate ($CrCl_3·3THF$), chromium trifluoride, chromium triiodide, etc., chromium alkoxides such as chromium tetra-tert.-butylate, i.e., $Cr(O-tert.C_4H_9)_4$, etc. The bridgehead lithium compound is, as described in the literature, generally prepared by reaction of a bridgehead halide with metallic lithium.

The reaction between the bridgehead lithium compound and the chromium salt is carried out in an inert aliphatic hydrocarbon diluent such as pentane, hexane, heptane, octane, etc. In general, the reaction is started at a low temperature such as −78°C., and continued at any temperature from about 0°C. to about 35°C. The following preparation of tetrakis (1-bicyclo-[2·2·1]-heptyl)chromium is typical of the methods used for the preparation of the tetrakis(bicycloheptyl)chromium compounds used in this invention.

Preparation of Tetrakis(1-bicyclo-[2·2·1]-heptyl)chromium

1-Norbornyllithium was prepared by adding a solution of 10.0 g. of 1-norbornyl chloride in 20 ml. of hexane to a refluxing dispersion (under argon) of 2 g. of lithium in 20 ml. of hexane during a period of 3 hours. The reaction mixture was refluxed for 16 hours and then was allowed to separate at room temperature into phases. The hexane phase was separated and the solvent and volatile by-products were removed under reduced pressure.

A ball mill with a nitrogen atmosphere was charged with 5.90 millimoles of chromium trichloride tetrahydrofuranate, 4.65 millimoles of 1-norbornyllithium and 25 ml. of pentane. After ball milling for 12 days at 35°C., the pentane phase was filtered through a column of basic alumina. The pentane was then removed from the filtrate, the residue was washed with pentane and then was dried under vacuum. The yield of tetrakis(1-norbornyl)chromium based on the 1-norbornyllithium was 71 percent.

These tetrakis(bicycloheptyl)chromium compounds are outstanding catalysts for the polymerization of 1-olefins. Any 1-olefin can be polymerized by means of these new catalysts as, for example, ethylene, propylene, butene-1, hexene-1, octene-1, etc., and mixtures of these olefins.

The polymerization can be carried out in batch or continuous processes. Generally the polymerization process is carried out in the presence of a liquid diluent such as a liquid hydrocarbon, which can be any aliphatic, cycloaliphatic or aromatic hydrocarbon that is free of ethylenic unsaturation. Exemplary of such diluents are pentane, hexane, heptane, isooctane, decane, cyclohexane, benzene, toluene, xylene, etc. A mixture of the olefin being polymerized and the liquid hydrocarbon can be allowed to flow over a fixed catalyst bed or the olefin can be passed into a mixture of the catalyst and the liquid hydrocarbon. In the latter case, the process can be operated as a slurry process by operating at a temperature below that at which the polymer dissolves or as a solution process by operating at a temperature above that at which the polymer dissolves. These catalysts can also be extended on a solid support and used, with an inert diluent or without a diluent, in a fluidized bed process. The tetrakis(bicycloheptyl)chromium compounds can be extended on any oxidic carrier material as, for example, any silica, alumina, thoria, titania etc., particulate material as well as the mixed aluminosilicates, etc. The amount of the chromium compound extended on the solid support can be varied as desired but generally will be from about 0.005 to about 0.5 millimole per gram of the carrier.

The tetrakis(bicycloheptyl)chromium compound can be activated by the addition of an organometallic activator or by exposure to light. However, yields and rates of polymerization are generally enhanced by using a combination of activator and exposure to light. Again, because of the versatility of these catalysts, a wide variety of activators can be used. Exemplary of the activators that can be used are mercury and zinc dihydrocarbon compounds, boron trihydrocarbons, organoaluminum compounds, and lead, tin or germanium tetrahydrocarbon compounds. Thus, any compound having the formula $MR_n$, where M is Hg, Zn, B, Al, Pb, Sn or Ge, R is a hydrocarbon radical free of ethylenic-unsaturation and n is the valence of M, can be used. Examples of these compounds are those where the R's are alike or different and can be alkyl, cycloalkyl, alkylcycloalkyl, aryl, aralkyl and alkaryl such as methyl, ethyl, propyl, n-butyl, tert.-butyl, cyclohexyl, phenyl, benzyl, tolyl, etc. In addition, aluminum compounds having the formula

where R is an alkyl, alkenyl, cycloalkyl, aryl, aralkyl, alkaryl, etc. group and X and Y are R (which can be the same or different), halide, H, alkoxide, etc. can be used. Of particular importance are the alkylaluminum dihalides or trialkylaluminum compounds. Exemplary of the organoaluminum compounds that can be used are trimethylaluminum, triethylaluminum, tri[n-butyl]aluminum, triisobutylaluminum, ethylaluminum dichloride, methylaluminum sesquichloride, ethylaluminum sesquichloride, diisobutylaluminum hydride, trihexylaluminum, tridodecylaluminum, trioctylaluminum, aluminum isoprenyl, triphenylaluminum, tribenzylaluminum, tri(cyclohexyl)aluminum, etc. Another type of organoaluminum compound that can be used to activate the polymerization is the reaction product of a trialkylaluminum with from about 0.05 to about 1.5 moles of water, which reaction may be carried out in situ or the reaction can be carried out prior to the polymerization process. When an organometallic activator is used it generally will be used in an amount such that the molar ratio of it to the chromium compound will be within the ratio of from about 0.5:1 to 100:1 and preferably from about 1:1 to about 10:1. The exact amount to be used will depend on the choice of activator, the type of process, being used, etc. Thus, if the process is being carried out in solution and the activator is being used in combination with light, with a very active activator such as triethylaluminum, the aluminum to chromium ratio is preferably from about 1:1 to about 2:1, but with a less active activator such as ethylaluminum dichloride, the ratio will preferably be 6:1. However, when the process is carried out with the chromium compound extended on a carrier such as silica, the ratio of the activator to chromium is of less importance and can be varied widely.

The temperature at which the polymerization is carried out will depend upon the type of process used, but generally will be within the range of from about 0°C. to about 120°C., although higher or lower temperatures can be used. Any pressure, from subatmospheric to as high as 30 atmospheres or more, can be used. Any amount of the chromium compound can be used to catalyze the polymerization from a minor catalytic amount to a large excess, if desired. Because these tetrakis(bicycloheptyl)chromium compounds are such active catalysts, as can be seen from the examples below, they can be used at a concentration of only 0.01 millimole per liter, and still produce a very active polymerization.

As pointed out above, the tetrakis(bicycloheptyl)chromium catalysts can be activated by exposure to light. Any convenient source of light that has a wave length longer than that of ultraviolet light can be used for irradiation of the chromium compound. Preferably, the light will have a wave length of from about 280 to about 600 nm. (nanometers). The tetrakis(bicycloheptyl)chromium compound when exposed to light is an extremely active catalyst. The life of this active catalyst species can be extended by the addition of a stabilizing agent, which may act as a complexing agent, such as an ether as, for example, a phenyl ether, or an amine as, for example, aniline, diphenylamine, etc. Even more effective, is to extend the chromium compound on a solid carrier such as silica and irradiate the so extended catalyst. If the extended catalyst is irradiated prior to the polymerization reaction, care should be taken to avoid over-irradiation. Should the latter occur the activity of the catalyst can be restored by addition of an organometallic activator such as triethylboron or triethylaluminum. A simpler and more easily controlled process is to irradiate the silica-extended-catalyst in the presence of the monomer, or monomers, being polymerized.

The following examples illustrate the process of polymerizing 1-olefins in accordance with this invention.

EXAMPLE 1

A 340 ml. polymerization vessel was flushed with argon and then was charged with 50 ml. of n-heptane, $1.0 \times 10^{-5}$ mole of tetrakis(1-norbornyl)chromium and $2.0 \times 10^{-5}$ mole of triethylaluminum. The vessel was completely shielded from light and was thermostatted at 50°C. Ethylene was added to a pressure of 30 p.s.i.g. After 3.3 hours at 50°C., the vessel was vented and cooled. The polyethylene was isolated and amounted to 24 g./mmole of chromium and the rate was 3.6 g./mmole Cr/atm./hr.

EXAMPLE 2

The procedure of Example 1 was repeated except that $3.0 \times 10^{-5}$ mole of the chromium compound was used and no triethylaluminum was added. The vessel was thermostatted at 23°C. and exposed to a 275 watt sunlamp positioned 12 inches away. After 30 min. the vessel was vented and cooled. The polyethylene so obtained amounted to 0.8 g. per millimole of chromium and the rate was 0.8 g./mmole Cr/atm./hr.

EXAMPLE 3

The procedure of Example 2 was repeated except that only $1.0 \times 10^{-5}$ mole of the chromium compound was used and $2.0 \times 10^{-5}$ mole of triethylaluminum was added. Also, the temperature was allowed to rise to 40°C. during the reaction. After 3.2 hours the vessel was vented and cooled. The polyethylene so produced amounted to 269 g. per mmole of chromium and the rate was 42 g./mmole Cr/atm./hr.

EXAMPLES 4–12

A series of polymerizations were run at 20°C. following the procedure described in Example 2 but varying the concentration of the chromium compound and/or the activator, triethylaluminum being used in Examples 5–7 and ethylaluminum dichloride in Examples 8-12. Tabulated below is the amount of the tetrakis(norbornyl)chromium and activator and the rate the polyethylene was produced (g./mmole Cr/atm./hr.).

| Ex. | Cr Compound Moles | Activator | Moles | Rate |
|---|---|---|---|---|
| 4 | $5 \times 10^{-6}$ | — | | 0.4 |
| 5 | $5 \times 10^{-6}$ | $(C_2H_5)_3Al$ | $5 \times 10^{-6}$ | 45 |
| 6 | $5 \times 10^{-6}$ | $(C_2H_5)_3Al$ | $10 \times 10^{-6}$ | 39 |
| 7 | $5 \times 10^{-6}$ | $(C_2H_5)_3Al$ | $30 \times 10^{-6}$ | 1.0 |
| 8 | $30 \times 10^{-6}$ | $C_2H_5AlCl_2$ | $60 \times 10^{-6}$ | 10.5 |
| 9 | $10 \times 10^{-6}$ | $C_2H_5AlCl_2$ | $20 \times 10^{-6}$ | 31.7 |
| 10 | $5 \times 10^{-6}$ | $C_2H_5AlCl_2$ | $10 \times 10^{-6}$ | 47.3 |
| 11 | $2.5 \times 10^{-6}$ | $C_2H_5AlCl_2$ | $5 \times 10^{-6}$ | 33.0 |
| 12 | $5 \times 10^{-6}$ | $C_2H_5AlCl_2$ | $30 \times 10^{-6}$ | 7.5 |

EXAMPLES 13–17

A series of ethylene polymerizations was run wherein various ethers or amines were added as stabilizers for the tetrakis(1-norbornyl)chromium catalyst species. In each case the polymerization vessel was charged with 50 ml. of heptane, $1.0 \times 10^{-5}$ mole of the chromium compound and the stabilizer and then was pressured with ethylene to 30 p.s.i.g. The polymerizations were run at 20°C. while exposing the vessel to the 275 watt sunlamp positioned 12 inches away. Tabulated below is the stabilizer used and amount thereof together with the rate the polyethylene was produced (g./mmole Cr/atm./hr.).

| Ex. | Stabilizer | Moles | Rate |
| --- | --- | --- | --- |
| 13 | — | | 0.8 |
| 14 | Diphenyl ether | $1 \times 10^{-5}$ | 4.0 |
| 15 | Anisole | $6 \times 10^{-6}$ | 2.8 |
| 16 | Aniline | $2 \times 10^{-6}$ | 1.8 |
| 17 | Diphenylamine | $5 \times 10^{-6}$ | 0.7 |

EXAMPLE 18

A polymerization vessel filled with argon was charged with 0.40 g. of a pyrogenic silica, which had been dried under a stream of nitrogen at 300°C., 50 ml. of heptane, and $1.0 \times 10^{-5}$ mole of tetrakis(1-norbornyl)chromium. The vessel was pressured to 30 p.s.i.g. with ethylene, thermostatted at 20°C. and irradiated with a 275 watt sunlamp positioned 12 inches away, the vessel being rotated during the irradiation. After 2 hours, the lamp was turned off, but the ethylene feed was continued for a total of 17.4 hours. The vessel was then vented and the polyethylene was isolated. It amounted to 1352 g. per millimole of chromium and the rate was 39 g./mmole Cr/atm./hr.

EXAMPLE 19

A pyrogenic silica was annealed at 700°C. for 48 hours, rehydrated in water at 100°C. and then was dried at 175°C. for 16 hours. A polymerization vessel filled with argon was charged with 0.35 g. of this silica, 30 ml. of heptane and $2.1 \times 10^{-5}$ mole of tetrakis(1-norbornyl)chromium. The suspension was exposed to the light of a 450 watt mercury vapor lamp for 30 min. whereupon the silica was turned to a tan color. The reactor was flushed with ethylene to displace the argon and was pressured with ethylene to 30 p.s.i.g. at 50°C. and $5.0 \times 10^{-5}$ mole of triethylboron was injected. When the polymerization rate had fallen to approximately one-fourth of its initial rate, then $5.0 \times 10^{-5}$ mole of triethylaluminum was added and the rate returned to the initial rate. At the end of 2.8 hours, the vessel was vented and cooled. The polyethylene so produced amounted to 590 g. per millimole of chromium at a rate of 105 g./mmole Cr/atm./hr.

EXAMPLE 20

A tetrakis(1-norbornyl)chromium on silica catalyst was prepared exactly as described in Example 19. The reactor was then flushed with ethylene and pressured with ethylene to 30 p.s.i.g. at 43°C. After 22 minutes of polymerization the vessel was vented, pressured with propylene to 30 p.s.i.g. and again vented and pressured with propylene two more times. With the pressure at 30 p.s.i.g. the mixture was held at 40°C. for 16 hours. There was then injected $1 \times 10^{-4}$ mole of triethylboron and $5 \times 10^{-5}$ mole of triethylaluminum and the reaction mixture was held at 50°C. for 16 hours. The polymerization was terminated and the polymer products isolated. The total polymer amounted to a yield of 23.6 g. per millimole of chromium. The heptane-soluble fraction amounted to 22 percent of the total polymer and on analysis was shown to be an ethylene–propylene copolymer containing about 20 mole percent of propylene. The other 78 percent of the product was polyethylene.

EXAMPLE 21

A glass 340 ml. reactor filled with argon was charged with 50 ml. of heptane, $2.0 \times 10^{-5}$ mole of triethylaluminum and $5.0 \times 10^{-6}$ mole of tetrakis(1-camphyl)chromium. The vessel was then pressured to 32 p.s.i.g. with ethylene at 15°C. and exposed to a 275 watt sunlamp positioned 12 inches away. After 1 hour at 15°C. the polymerization was terminated. The polyethylene so obtained amounted to 49 g. per millimole of chromium and the rate was 25 g./mmole Cr/atm./hr.

What we claim and desire to protect by Letters Patent is:

1. The process of polymerizing 1-olefins which comprises contacting at least one 1-olefin with a catalyst comprising a tetrakis(1-bicycloheptyl)chromium compound having the formula

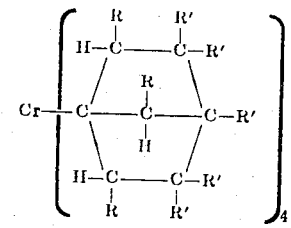

where one of the Rs is H or $CH_3$ and the other Rs are H and each of the R's is H or $CH_3$, and the total number of $CH_3$ groups attached to the bicycloheptyl ring is 0 to 3, wherein the chromium compound is activated by at least one of the group: (1) irradiation with light having a wave length of from about 280 to about 600 nanometers and (2) an organometallic compound of a metal of groups II-B, III-A or IV-A of the Periodic Table.

2. The process of claim 1 wherein the chromium compound is activated by a combination of (1) and (2).

3. The process of claim 1 wherein the organometallic activator is an organoaluminum compound.

4. The process of claim 2 wherein the process is carried out in solution in a hydrocarbon solvent free of ethylenic unsaturation.

5. The process of claim 1 wherein the tetrakis(bicycloheptyl)chromium compound is extended on a solid support.

6. The process of claim 5 wherein the support is silica.

7. The process of claim 6 wherein the tetrakis(bicycloheptyl)chromium compound extended on silica is irradiated with light prior to use in the polymerization process and is further activated by the addition of a trialkylaluminum.

8. The process of claim 6 wherein the tetrakis(bicycloheptyl)chromium compound extended on silica is irradiated with light in the presence of the 1-olefin.

9. The process of claim 4 wherein the chromium compound is tetrakis(1-norbornyl)chromium and the 1-olefin is ethylene.

10. The process of claim 8 wherein the chromium compound is tetrakis(1-norbornyl)chromium and the 1-olefin is ethylene.

11. The process of claim 9 wherein the organometallic activator is triethylaluminum.

12. The process of claim 9 wherein the organometallic activator is ethylaluminum dichloride.

13. The process of claim 10 wherein triethylaluminum is added.

14. The process of claim 10 wherein triethylboron is added.

15. A polymerization catalyst comprising a tetrakis(bicycloheptyl)chromium compound extended on a solid support, said chromium compound having the formula

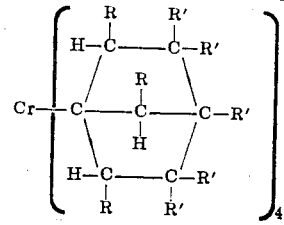

where one of the Rs is H or $CH_3$ and the other Rs are H and each of the R's is H or $CH_3$, and the total number of $CH_3$ groups attached to the bicycloheptyl ring is 0 to 3.

16. The catalyst of claim 15 wherein the chromium compound is tetrakis(1-norbornyl)chromium and the solid support is silica.

17. The catalyst of claim 16 wherein the catalyst is activated by irradiation with light having a wave length of from about 280 to about 600 nanometers.

* * * * *